UNITED STATES PATENT OFFICE.

JOHN A. SCHAEFER, OF NEW YORK, N. Y., ASSIGNOR TO JOHN A. SCHAEFER, JR., ROBERT W. DAVIES, AND JACOB STOCKINGER, ALL OF THE SAME PLACE.

PROCESS OF EXTRACTING MALT.

SPECIFICATION forming part of Letters Patent No. 234,815, dated November 23, 1880.

Application filed April 9, 1880. (No model.)

*To all whom it may concern:*

Be it known that I, JOHN A. SCHAEFER, of New York, in the county of New York, and in the State of New York, have invented certain new and useful Improvements in the Process of Extracting Malt; and I do hereby declare that the following is a full, clear, and exact description thereof.

My invention is intended as an improvement over Letters Patent No. 220,872, granted to me October 21, 1879; and it consists in an improved process for extracting malt in the manufacture of beer, as will be hereinafter more fully set forth and pointed out in the claim.

The malt should be ground in a burr-stone mill as coarsely as possible, care being taken to take everything out of the grain and leave no "tailings," so that there shall be no waste. The meal thus obtained is bolted and all the hulls, bran, &c., removed. The ground malt is then placed in the hopper over the mash-tub, and the space between the false and real bottoms of the mash-tub filled with clean long rye-straw or other suitable filter, through which the liquor passes.

The water for the mash-tub is prepared for the first part of the mash by raising its temperature to from 105° to 110° Fahrenheit, and is allowed at that temperature to run into the mash-tub. The mash-machine is then started and the malt allowed to run into the mash-tub. When the malt is all in the mash-machine is stopped and kept still for about half an hour. The mash-machine is then started again, and the balance of the water for the mash is let in slowly. This water should be of the temperature of about 212° Fahrenheit before being introduced into the mash-tub. As soon as the water is all in the mash-machine is stopped. The temperature of the mash should then be from 160° to 167° Fahrenheit. After standing for an hour or more the wort is ready to be tapped, and every drop of liquid in the mash-tub will run off perfectly clear and pure, without forming any paste on the bottom of the mash-tub, so that a much finer article of beer, ale, or other malt liquors may be manufactured and the same prevented from souring, and at the same time making a considerable saving in the amount of malt consumed in the manufacture.

In my former patent above referred to cut straw or similar equivalent material was used as an ingredient in the mash—that is, mixed with the ground and bolted malt-meal; but by my present process this cut straw or equivalent material can be entirely dispensed with. The use of cut straw or similar material is objectionable, troublesome, and expensive. In my process nothing but the ground and bolted malt-meal is used in the mash.

The object of first grinding and then bolting the grain is twofold. The grinding process cracks and breaks the grain into a coarse meal and at the same time loosens up and frees the husk, while the bolting of said ground grain removes not only the husk, but also the fine meal, from the same.

It is very essential, in making fine, pure beer, that the husks of the grain be separated before the malt is placed in the tubs, for they can do no good, but, on the contrary, impart an improper taste to the beer and cause it to sour.

By removing the fine meal or flour from the ground grain I prevent clogging in the bottom of the tubs when the worts are to be drawn off. The fine meal or flour, when allowed to remain with the malt, will settle at the bottom of the tub, and thus stop up the vent-holes. The coarser the meal the less liability there is of clogging and the freer the worts will run off.

The size of the grains of meal may vary from coarse to very coarse, as coarse as the stones will grind and still crack and break the kernel and remove the husk.

Having thus fully described my invention, what I claim as new, and desire to secure by Letters Patent, is—

The process herein described for obtaining wort from malt, consisting in, first, coarsely grinding the grain and bolting it so as to remove all the husks and fine meal or flour, then introducing said coarsely-ground grain into the mash-tub containing water at about 104° Fahrenheit, and then, after a suitable interval, raising the temperature to about 167° Fahrenheit by adding hot water, and, finally, drawing off the wort through the long straw in the bottom of the tub, as usual.

In testimony that I claim the foregoing I have hereunto set my hand this 26th day of March, 1880.

JOHN A. SCHAEFER.

Witnesses:
BENJN. PAGE,
ROBERT W. DAVIES.